US010282927B1

(12) United States Patent
Hutz et al.

(10) Patent No.: US 10,282,927 B1
(45) Date of Patent: May 7, 2019

(54) ACCESS CONTROL PROVISIONING

(71) Applicant: Alarm.com Incorporated, Tysons, VA (US)

(72) Inventors: David James Hutz, Herndon, VA (US); Andrei Aurelian Furtuna, Annandale, VA (US); Fabian Emilio Philipe Camargo, Falls Church, VA (US); Abraham Joseph Kinney, Vienna, VA (US); Noah Robert Weingart, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/940,257

(22) Filed: Mar. 29, 2018

Related U.S. Application Data

(60) Provisional application No. 62/478,423, filed on Mar. 29, 2017.

(51) Int. Cl.
*H04L 29/06* (2006.01)
*G07C 9/00* (2006.01)

(52) U.S. Cl.
CPC ..... *G07C 9/00007* (2013.01); *G07C 9/00309* (2013.01)

(58) Field of Classification Search
CPC ............... G07C 9/00; H04W 4/02; A47F 3/00
USPC ...... 340/10.1-10.5, 5.61, 5.92, 572.1, 568.1; 235/383; 705/26.62, 27.1, 27.2
See application file for complete search history.

(56) References Cited

U.S. PATENT DOCUMENTS

| | | | | |
|---|---|---|---|---|
| 5,086,385 | A | 2/1992 | Launey et al. | |
| 5,923,264 | A | 7/1999 | Lavelle et al. | |
| 6,738,772 | B2 | 5/2004 | Regelski et al. | |
| 6,748,343 | B2 | 6/2004 | Alexander et al. | |
| 7,380,279 | B2 | 5/2008 | Prokupets et al. | |
| 7,583,188 | B2 * | 9/2009 | Sawhney ........... | G07C 9/00103 340/5.5 |
| 8,836,470 | B2 * | 9/2014 | Pineau ............... | G07C 9/00166 340/5.2 |
| 9,538,262 | B2 * | 1/2017 | German ................. | H04Q 1/136 |
| 2003/0163522 | A1 | 8/2003 | Nakamura et al. | |
| 2006/0058900 | A1 | 3/2006 | Johanson et al. | |
| 2006/0058923 | A1 | 3/2006 | Kruk et al. | |
| 2007/0043954 | A1 | 2/2007 | Fox | |

FOREIGN PATENT DOCUMENTS

| | | |
|---|---|---|
| WO | WO2002027438 | 4/2002 |

* cited by examiner

*Primary Examiner* — Nam V Nguyen
(74) *Attorney, Agent, or Firm* — Fish & Richardson P.C.

(57) ABSTRACT

Method, systems, devices, and techniques for access control provisioning are described. A monitoring system configured to monitor a property includes an access control device that is configured to receive an access control request and provide access to a portion of the property in response to the request. The system also includes a control unit or board that is configured to transmit, through a particular relay out of multiple relays, the access control request. The control unit further receives data indicating that the access control device received the access control request and determines that the particular relay corresponds to the access control device.

18 Claims, 5 Drawing Sheets

ACCESS CONTROL PROVISIONING

CROSS-REFERENCE TO RELATED APPLICATION

This application claims the benefit of U.S. Provisional Application No. 62/478,423, filed Mar. 29, 2017, and titled "Access Control Provisioning," which is incorporated by reference.

TECHNICAL FIELD

This application relates generally to systems for controlling access to a property.

BACKGROUND

A security system can include an access control board to regulate entry and exit through multiple access points of a property. When installing a new access control board, e.g., when upgrading the security system, the new control board may require configuration.

SUMMARY

Many properties, such as office buildings, industrial plants, and other commercial sites, are equipped with a security monitoring system that monitors and controls access to the property. In some implementations, the monitoring system includes an access control board that communicates with and/or controls the functions of various card readers, door locks, request to exit (REX) devices, door sensors, and other devices related to access control. The various readers, locks, devices, and sensors can connect to various terminals of the control board. In some examples, the access control board must be configured, through hardware or software, to determine the relationships between the various control board terminals (e.g., determining that a particular reader terminal corresponds to a particular door lock terminal). This document discloses methods, systems, and techniques that are used to provide access control provisioning for a control board of a security system. As discussed in more detail below, a system that provides access control provisioning can monitor and identify peripherals, such as input devices (e.g., card readers or REX devices) and access control mechanisms (e.g., electronic or magnetic door locks) that are attached to various wiring terminals of an access control board to configure terminals and determine relationships among terminals (e.g., associating a particular card reader terminal with a particular door lock) within the board.

In some implementations, a monitoring system configured to monitor a property includes an access control device (e.g., a magnetic door lock, an electronic door lock, or another access control mechanism) that is configured to receive an access control request and provide access to a portion of the property (e.g., through a door) in response to the access control request. The system further includes a monitor control unit that is configured to (i) transmit, through a given relay of a plurality of relays, a given access control request, (ii) receive data indicating that the access control device received the given access control request, and (iii) based on the data indicating that the access control device received the given access control request, determine that the given relay of the plurality of relays corresponds to the access control device.

In some implementations, the system includes an additional access control device that is configured to receive an additional access control request and provide access to an additional portion of the property in response to receiving the additional access control request. In these examples, the monitor control unit can be configured to receive additional data indicating that the additional access control device did not receive the given access control request, and, based on the additional data indicating that the additional access control device did not receive the given access control request, determine that the given relay of the plurality of relays does not correspond to the additional access control device.

In some implementations, the monitor control unit transmits, through an additional relay of the plurality of relays, the additional access control request. The control unit may then receive additional data indicating that the additional access control device received the additional access control request. Based on the additional data indicating that the additional access control device received the additional access control request, the control unit can determine that the additional relay of the plurality of relays corresponds to the additional access control device.

In some implementations, based on transmitting, through the given relay of the plurality of relays, the given access control request, the monitor control unit transmits, to a client device, additional data indicating that the monitor control unit transmitted the given access control request. Here, the data indicating that the access control device received the given access control request is received from the client device.

In some implementations, before transmitting, through the given relay of the plurality of relays, the given access control request, the monitor control unit determines that the given relay does not correspond to an additional access control device. The control unit then transmits, through the given relay of a plurality of relays, the given access control request based on determining that the given relay does not correspond to the additional access control device.

In some implementations, after transmitting, through the given relay of a plurality of relays, the given access control request, the monitor control unit determines that a particular amount of time has elapsed and determines that the given relay of the plurality of relays does not correspond to the access control device based on determining that the particular amount of time has elapsed.

In some implementations, the access control device is configured to provide access to the portion of the property through a door. Based on determining that the given relay of the plurality of relays corresponds to the access control device, the monitor control unit can determine that the given relay of the plurality of relays and the access control device both correspond to the door.

In some implementations, the monitoring system also includes an input device that is located at the property, where the input device is configured to transmit data indicating an interaction with the input device. For example, the input device can be an electronic card reader or a request to exit device. Furthermore, the monitor control unit can include a plurality of input terminals that are each configured to receive data indicating an interaction with a given input device. The control unit can (i) receive, through a given input terminal of the plurality of input terminals, the data indicating the interaction with the input device, (ii) receive, from a client device, data indicating that the input device is associated with a door, and (iii) based on the data indicating that the input device is associated with the door, determine that the given input terminal and the input device both correspond to the door.

Certain implementations of the disclosed methods, systems, and techniques have particular advantages. In some examples, the systems and techniques enable automated or semi-automated configuring of a newly-installed access control board (e.g., when an operator replaces a previous access control board with a new access control board). The operator can connect the peripherals, including input devices and access control mechanisms, into arbitrary wiring terminals of the new control board. The operator can use the disclosed techniques to determine the relationships between terminals and configure the access control board functionality, simplifying the installation process. In some examples, the disclosed systems and techniques enable an operator to add new access control devices to an existing control board and reconfigure the existing board to communicate with and control the new access control devices. Some implementations have additional advantages.

The details of one or more implementations are set forth in the accompanying drawings and the description below. Other potential features and advantages of the disclosure will be apparent from the description, the drawings, and the claims.

BRIEF DESCRIPTION OF THE DRAWINGS

Like designations in the various drawings indicate like elements.

DETAILED DESCRIPTION

Figure 1:
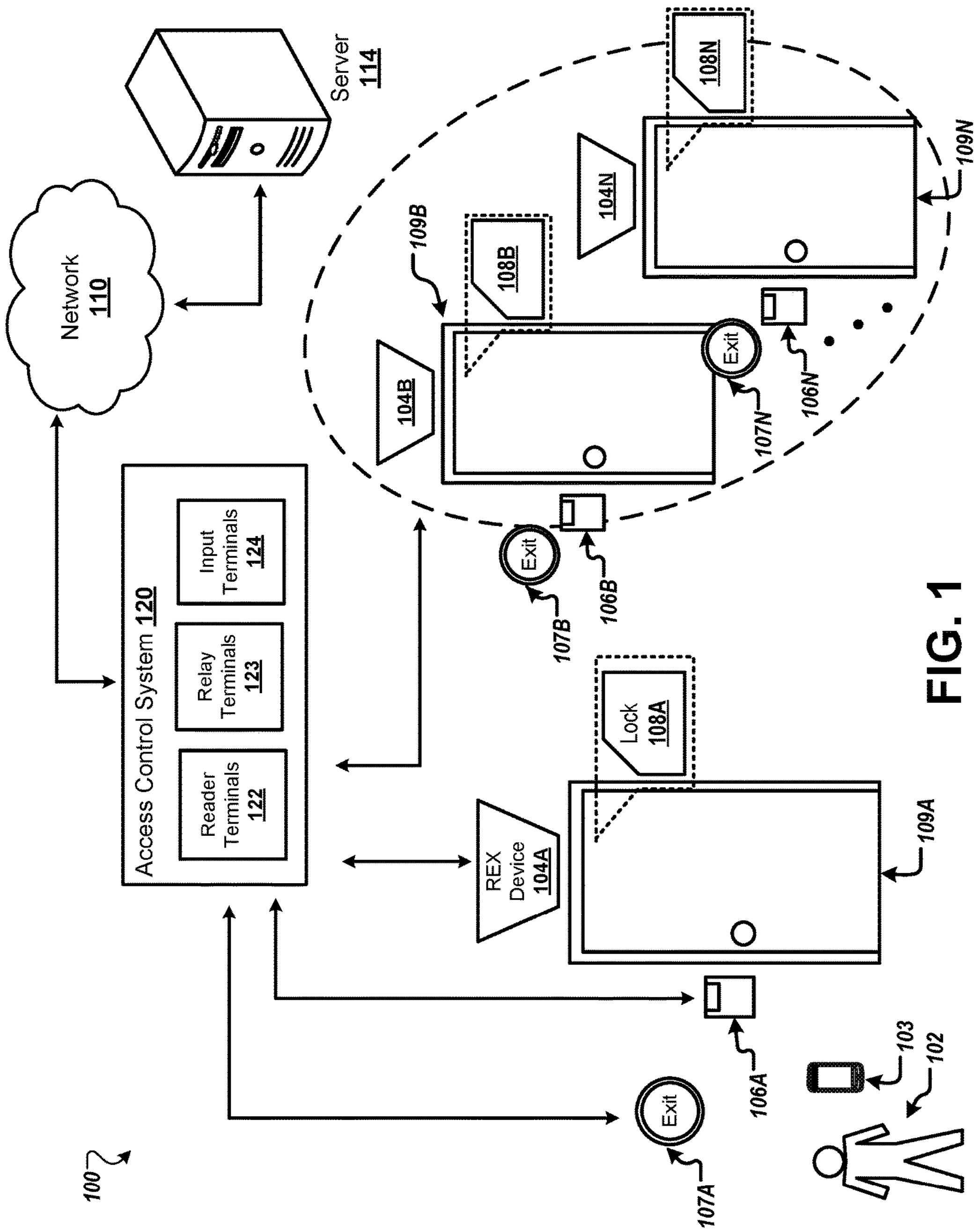
FIG. 1 is a diagram of an example system for access control provisioning

Currently, operators of security systems need to monitor readers, locks, request to exit (REX) devices, door sensors, and other devices that are in communication with an access control board. Specifically, the various wiring terminals of an access control board need to be manually configured by grouping the devices to particular wiring terminals of the access control board using hardware and/or software of the access control board. As the number of terminals and devices connected to the terminals of an access control board increases, it becomes difficult to identify which wiring terminals correspond to which devices. For example, in a security system of electronically locked doors, present technologies may require operators to track where the readers that correspond to the electronically locked doors are plugged into the access control board, as well as what wiring terminals the readers correspond to. Further, if an access control board is to be replaced by a new access control board, it may become problematic to maintain the configuration of the original access control board when transitioning to the new board. In this instance, an operator may not have access to software of the original access control board that identifies the devices and corresponding terminals of the access control board.

This document discloses methods, systems, and devices that are used to provide access control provisioning. As discussed in more detail below, a system that provides access control provisioning can monitor and identify peripherals, such as card readers, that are attached to various wiring terminals of an access control board to configure input terminals, such as access control mechanisms, within the access control board. The system may be configured to instruct an operator, or user, to swipe a programmable card at a particular reader in a security system. The system can sequentially fire relays of the access control board that correspond to potential access control mechanisms, such as electronically locked doors, that may correspond to the particular reader. The system may receive data indicating that the currently fired relay changes the state of a particular access control mechanism, (e.g., the door has unlocked), and therefore determine that the particular access control mechanism is associated with the particular reader at which the operator swiped the card. The system may iterate through the process of firing relays and identifying which peripherals correspond to which wiring terminals.

In some examples, the system that provides access control provisioning replicates or maintains the configuration of an access control board when switching access control boards. In this instance, an operator may replace a previous access control board for a new access control board. The operator may unplug all peripherals and access control mechanisms from the previous control board. The operator may plug the peripherals into arbitrary wiring terminals of the new control board, and use the system that provides access control provisioning to determine which terminals the access control mechanisms should be plugged into. Specifically, the system for providing access control provisioning may cycle through a plurality of relays for a particular peripheral, such as a magnetic lock, until the system determines that a particular relay corresponds to the particular peripheral. Once the particular relay is determined, the system may map the relay to an electronic lock of a particular door. The operator may iterate through the peripherals and access control mechanisms until the new access control board is configured with the previous configuration of the previous access control board.

FIG. 1 is a diagram of an example system 100 for access control provisioning. The system 100 includes a network 110, such as a local area network (LAN), a wide area network (WAN), the Internet, or any combination thereof. The network 110 connects a computing device 103, REX devices 104A-N, readers 106A-N, exit buttons 107A-N, doors 108A-N, locks 109A-N, an access control system 120, and a server 114.

The example system 100 may include multiple computing devices 103, REX devices 104A-N, readers 106A-N, exit buttons 107A-N, access control mechanisms 108A-N, doors 109A-N, access control boards 112, and servers 114. In some implementations, the REX devices 104A-N, readers 106A-N, exit buttons 107A-N, doors 108A-N, locks 109A-N may be directly connected to the access control system 120 through either wired or wireless connections.

The computing device 103 may include a laptop, desktop, smartphone, tablet, or any other computing device that is known. The computing device 103 may be configured to receive user input from user 102. The user input can indicate that the user 102 is interacting with a reader 106A-N. For example, the user 102 may provide user input via a user interface of the computing device 103. The user input may indicate that the user 102 is swiping a programmable card at reader 106A. In this instance, the computing device 103 may transmit data indicating the card being swiped at reader 106A to the server 114 via the network 110. Additionally, the reader 106A may transmit data to the access control system 120 and/or the server 114 via the network 110. For example, the reader 106A may transmit data to the access control system 120 as it is swiped at reader 106A and transmit the card data to the server 114. In this instance, server 114 may provide data to the access control system 120 indicating that the server 114 authenticated the card.

The access control system 120 can include one or more access control boards, access control panels, and the like. An access control board of the access control system 120 can include a plurality of wiring terminals such as reader terminals 122, relay terminals 123, and input terminals 124. The reader terminals 122 may be connected to the readers 106A-N or other detection devices that provide different data streams to the access control system 120 depending on the card or fob interacting with the detection device. The input terminals 124 may be connected to the request to exit (REX) devices 104A-N and/or the exit buttons 107A-N. The input terminals 124 may also be connected to input devices which transmit a binary signal indicating whether the user is interacting with the input device. The relay terminals 123 may be connected to the electronic locks 109A-N and any other devices that receive a binary instruction from the access control system 120.

To begin identifying which devices are associated with each door, the user 102 may indicate on the computing device 103 the location of the user. The computing device 103 may be executing an application that interfaces with the server 114 and the access control system 120. The application may be configured to map different devices to different doors depending on the user 102's interaction with the application. The user 102 indicates to the application that the user 102 is at door 109A. The user 102 may swipe the card at the reader 106A for verification. If the card is verified by the reader 106A, the server 114, and/or the access control system 120, the application may map the reader 106A to door 109A.

The application and/or the server 114 may be configured to instruct the access control system 120 to cycle through the relay terminals 123 in response to receiving data indicating the card being swiped at reader 106A. The access control system 120 cycles through the relay terminals 123 to determine which relay terminal is connected to lock 108A that is located at door 109A. The application may indicate to the user 102 that the access control system 120 is cycling through the relay terminals. The application may provide an interface for the user 102 to interact with when the access control system 120 activates the relay terminal 123 that corresponds to the lock 108A. For example, the interface may provide a selectable option that the user can select when the access control system 120 activates the relay terminal corresponding to the lock 108A. The interface may provide a selectable option for the user to select to indicate that the activated relay terminal does not correspond lock 108A. In some implementations, the application may provide a window of time for the user to provide an affirmative input that the activated relay terminal corresponds lock 108A. If the application does not receive the affirmative input, then the access control system 120 may stop activating the active relay terminal and activate another relay terminal. In this instance, the application and/or the server 114 can match the door 109A with the relay terminal 123 connected to the lock 108A.

In some implementations, the server 114 can use information from a door sensor to match the door 109A with the relay terminal 123 connected to the lock 108A. Here, the door sensor can be a separate contact sensor that indicates whether the door 109A is open or closed. The door sensor can also be connected to a terminal of the access control system 120, allowing the system 120 to monitor the state of the sensor. In one example, the application can instruct the user to apply pressure to (e.g., lean on) the door 109A while the access control system 120 cycles through the relay terminals, activating each in sequence. When the access control system 120 activates the relay terminal 123 that corresponds to the lock 108A on the door 109A, the pressure applied by the user will open the door 109A and the door sensor will change state to indicate that the door 109A is open. While cycling through the relay terminals, the access control system 120 can monitor the terminals associated with door sensors. When the system 120 detects that a door sensor changes state, indicating that the door 109A has opened, the system 120 can match the door 109A with the most recently activated relay terminal 123.

In some implementations, the door sensor can be integrated as part of the relay. In this case, when a user opens the door 109A, the state of the relay also changes. Here, the access control system 120 can match the door 109A with the appropriate relay terminal 123 by instructing the user, through the application, to force open the door 109A. The system 120 can then monitor the relay terminals for a change in relay state, then match the relay terminal 123 that changed state with the door 109A.

After the reader 106A is matched with a particular relay terminal in the access control system 120, the server 114 may be configured to transmit a notification to the computing device 103 indicating the match. For example, upon matching the reader 106A with the wiring terminal on the access control system 120, the server 114 can transmit a notification indicating that the reader 106A is associated with a particular wiring terminal and door 109A.

Similar to the reader terminals 122, the user 102 may indicate to the application that the user is interacting with a REX device. In this instance, the user 102 may indicate on an interface of the application that the user 102 is interacting with the REX device 104A that is located at door 109A. The user 102 may activate the REX device 104A by moving in front of the REX device 104A. The server 114 may instruct the access control system 120 to scan the input terminals 124 for data indicating an activated input device. The access control server 120 locates the active input terminal, and the server 114 maps the REX device 104A to door 109A.

Additionally, the user 102 may indicate to the application that the user is interacting with an exit button. In this instance, the user 102 may indicate on an interface of the application that the user 102 is interacting with the exit button 107A that is located at door 109A. The user 102 may activate the exit button 107A by pressing the exit button 107A. The server 114 may instruct the access control system 120 to scan the input terminals 124 for data indicating an activated input device. The access control server 120 locates the active input terminal, and the server 114 maps the exit button 107A to door 109A.

The user may repeat the steps above for doors 109B-109N to map the card readers 106B-N, REX devices 104B-N, locks 108B-N, and exit buttons 108B-N to the doors 109B-N. With each of the doors 109A-109N mapped to the card readers 106A-N, REX devices 104A-N, locks 108A-N, and exit buttons 108A-N to the doors 109A-N.

Each programmable card may be associated with an identifier, however, as security systems grow in size, there is a nonzero chance that a first programmable card may include an identifier similar to that of a second programmable card. In some examples, the system 100 includes functionality for identifying overlapping programmable cards. As such, the system 100 can be configured to provide an audial, visual, or combination of audial and visual alert/notification upon detection of overlapping programmable cards. For example, there may be multiple access control systems in the system 100, such as at different properties. Each of the access control boards can be associated with a plurality of readers 106A-N and locks 108A-N. If a set of overlapping programmable cards are used within the system 100, (even among different access control boards), the server 114 can be configured to provide an alert indicating that the set of overlapping programmable cards has been identified.

In some implementations, the server 114 of the system 100 includes a card format identifier for determining the encoding format implemented by a particular programmable card. Different programmable cards may encode access information in different formats. For example, different programmable cards may encode the same facility data, card serial number data, and error detection data (e.g., parity bits) using a different number of bits or a different ordering of bits. In some examples, different cards used to access the same facility use the same encoding format and contain the same facility data, but each facility user's card has a different, unique serial number.

When the system 100 is first applied to a facility, the server 114 may not store information describing the particular format used by cards at the facility. The card format identifier enables the server 114 or a user 102 to determine the appropriate card format.

To determine the format of the programmable cards for a particular facility, the user 102 swipes an authorized card at a reader 106A-N, which transmits the data to the access control system 120. The access control system 120 then sends the encoded card data to the server 114. Based on the length (e.g., the number of bits) of the encoded card data, the card format identifier identifies one or more potential formats that are likely to correspond to the encoded data format. For example, the card format identifier may store a list of formats. If the encoded card data consists of thirty-four bits, the card format identifier may then identify any thirty-four bit format in the list as a potential format.

The card format identifier then decodes the encoded card data according to the one or more identified potential formats and provides as output one or more data fields associated with each of the potential formats used. For example, the card format identifier may provide as output a list of potential facility codes and serial numbers that were decoded using each of the potential formats. In some implementations, the card format identifier provides the output to the computing device 103 of the user 102.

Based on the outputs, the server 114 or the user 102 can select the format that generated the correct output. For example, if the user 102 has knowledge of the serial number for the swiped card (e.g., if the serial number is printed on the card), the user 102 can select the format that generated the correct serial number. The user 102 can indicate the selected format by, for example, inputting data to the computing device 103. The server 114 can then use the selected format to read and decode card data obtained in subsequent readings of programmable cards at the same facility.

The system 100 for providing access control provisioning can be implemented as hardware, software, or any combination thereof. The system 100 can be used as a verification wizard that determines access control board configurations including a plurality of different readers and access control mechanisms. The system 100 can be implemented to identify a misstep that occurs during the installation of a new access control board. The system 100 can also be implemented to identify miswiring that occurs when swapping readers 106A-N within a security system. As such, the system 100 can collect configurations of access control boards that need to be transferred to new systems, or maintained as failsafe data.

Figure 2:
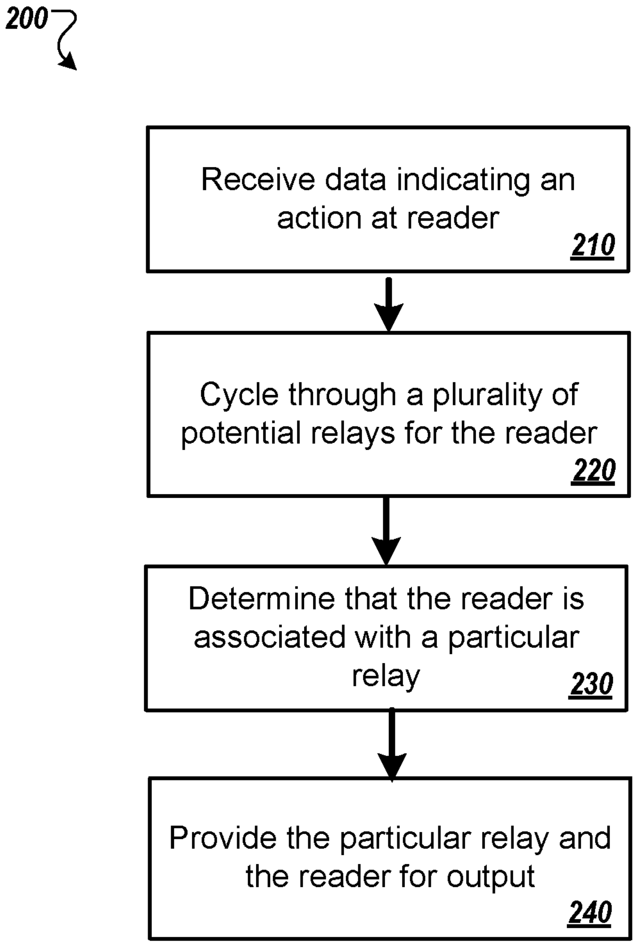
FIG. 2 is a flowchart illustrating an example process for determining that a reader is associated with a relay.

FIG. 2 is a flowchart illustrating an example process 200 for determining that a reader is associated with a relay. The process 200 can be performed by servers or other computing devices. For example, operations of process 200 can be performed by server 114 of FIG. 1.

At step 210, the server receives data indicating an action at a reader. The server may receive the data via a computing device in communication with the server over a network. The data can include a notification that indicates the action is being performed at the reader, has been performed at the reader, or is about to be performed at the reader. The action can include a programmable card being swiped at the reader, a biometric input being provided at the reader, or any other form of authentication detected by the reader. The reader may detect the action and transmit data representative of the action to the access control system. The access control system may attempt to authenticate the data. For example, the reader may detect that a card has been swiped, and transmit data identifying the card to the access control system. The access control system may transmit data identifying the card as valid or invalid to the server. In another example, the reader may detect that the card has been swiped and transmit data identifying the card to the access control system which then transmits the data to the server so that the server may determine whether or not the card is valid.

In some examples, the server can be connected to a communication network that identifies states of doors associated with the readers. For example, the server can receive information from a door sensor that indicates whether a door is open or closed, locked or unlocked. As such, the server can be configured to identify what the states of the doors are, (e.g., unlocked, locked, etc.), as well as determine when the state of each door changes. Thus, the server can monitor access control mechanisms, or locks, associated with the doors.

At step 220, the server cycles through a plurality of potential relay terminals for the reader. For example, in response to receiving data indicating that a verified card has been swiped at the reader, the server may be configured to instruct the access control system to cycle through a plurality of potential relays for the reader. The potential relays may each correspond to a particular access control mechanism, such as an electronic lock of a door. As such, the server may be configured to cycle through the relays to change the state of a particular access control mechanism until the particular access control mechanism changes states, e.g., a particular door associated with the reader unlocks.

At step 230, the server determines that the reader is associated with a particular relay terminal. In response to providing an instruction to the access control system to change the state of a particular access control mechanism, the server determines that the reader is associated with a cycled relay terminal, such as the relay terminal with the most recently fired relay. Specifically, the server can be configured to determine that the reader and the corresponding access control mechanism that changes states are associated with each other. Further, the server can be configured to determine which of the wiring terminals, such as peripheral terminals and input terminals, the reader and the corresponding access control mechanism each correspond to.

At step 240, the server provides the particular relay terminal and the reader for output. Upon matching the particular relay terminal with the particular reader, the server can be configured to transmit a notification to the computing device. The notification can include an indication that a match has been found, an indication of the particular relay terminal associated with the reader and access control mechanism, an indication of the particular access control mechanism associated with the reader, an indication of the wiring terminal of the particular reader, or any combination thereof.

Further, the server can be configured to store the particular reader along with the associated relay terminal for reference. Therefore, upon iterating through multiple readers, by sequentially firing the relay terminals of the access control board, the server can determine a configuration for the access control board. The server can determine a configuration for the access control board that identifies which components, such as peripherals and access control mechanisms, are associated with which wiring and relay terminals of the access control board.

Figure 3:
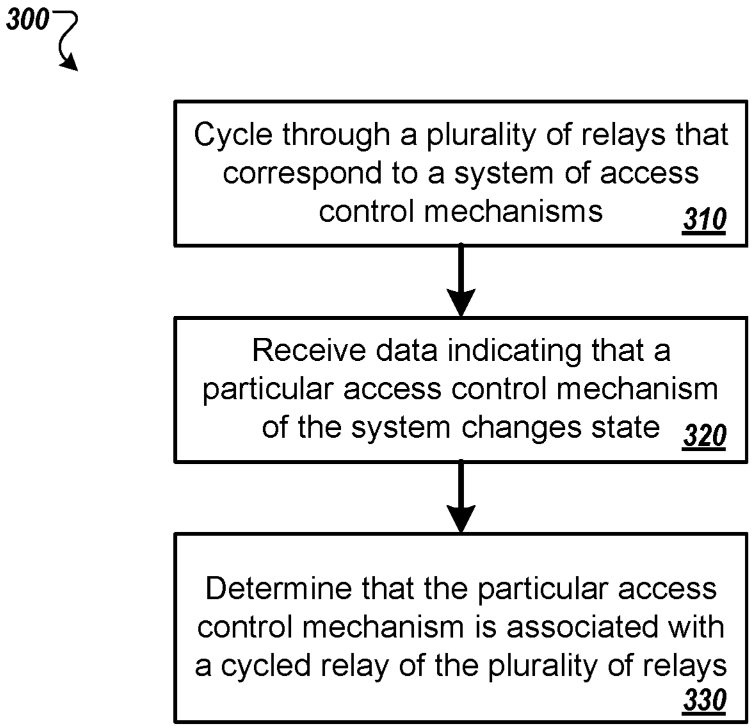
FIG. 3 is a flowchart illustrating an example process for determining that an access control mechanism is associated with a relay.

FIG. 3 is a flowchart illustrating an example process 300 for determining that a reader is associated with a relay. The process 300 can be performed by servers or other computing devices. For example, operations of process 300 can be performed by server 114 of FIG. 1.

At step 310, the server cycles through a plurality of relays that correspond to a system of access control mechanisms. The server can be configured to instruct an access control system to cycle through the plurality of relays at a predetermined point in time. For example, the server can be configured to cycle through the plurality of relays upon receiving data indicating that a new access control board has been implemented in a security system. In another example, the server can be configured to cycle through the plurality of relays upon receiving user input via a computing device in communication with the server over a network. The server can be configured to cycle through a plurality of relays that correspond to a system of access control mechanisms, such as a plurality of magnetic locks that are installed into a plurality of door frames in a security system. The server can be configured to cycle through the plurality of relays to determine associations between the relays and access control mechanisms.

At step 320, the server receives data indicating that a particular access control mechanism of the system changes state. The server may receive data automatically when a cycled relay adjusts the state of a particular access control mechanism. Additionally, or alternatively, the server may receive data indicating that the cycled relay adjusts the state of the particular access control mechanism via a computing device in communication with the server over the network. For example, the server can be configured to cycle through a plurality of relays that correspond to a system of magnetic locks installed in door frames. The server may sequentially activate each relay for a period of one minute. Over the span of the minute, the server may request information indicating whether or not a particular access control mechanism, or a particular magnetic lock, changes state. In this instance, a user may provide user input via the computing device indicating that the particular magnetic lock has unlocked.

At step 330, the server determines that the particular access control mechanism is associated with a cycled relay of the plurality of relays. In response to receiving data indicating that the particular access control mechanism, or magnetic lock, changes state, the server can be configured to match the cycled relay with the particular access control mechanism. Further, the server can be configured to determine that the cycled relay and the particular access control mechanism correspond to a particular wiring terminal in the access control board. Therefore, the server can be configured to determine a configuration of an access control board by sequentially firing relays of the access control board and determine that the cycled relays match certain access control mechanisms based in part on received data indicating that the certain access control mechanisms change state.

Figure 4:
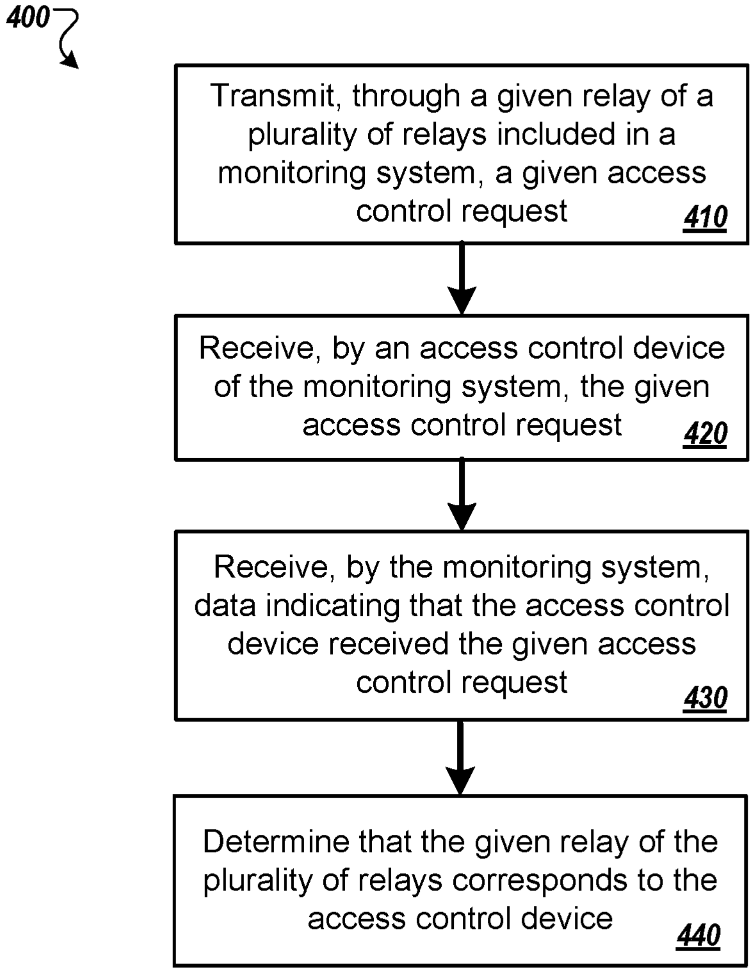
FIG. 4 is a flowchart illustrating an example process for determining that an access control device is associated with a relay of a monitoring system.

FIG. 4 is a flowchart illustrating an example process 400 for determining that an access control device is associated with a relay of a monitoring system. Process 400 can be performed by a system for access control provisioning, such as the monitoring system 500 of FIG. 5 or the system 100 of FIG. 1. Briefly, process 400 includes transmitting, through a given relay of a plurality of relays included in a monitoring system, a given access control request (410); receiving, by an access control device of the monitoring system, the given access control request (420); receiving, by the monitoring system, data indicating that the access control device received the given access control request (430); and based on the data indicating that the access control device received the given access control request, determining that the given relay of the plurality of relays corresponds to the access control device (440).

In more detail, at step 410, the monitoring system transmits, through a given relay of a plurality of relays including in a monitoring system that is configured to monitor a property, a given access control request. For example, in some implementations, the monitoring system includes an input device, that can be an electronic card reader, an exit button, or another request to exit device. The input devices may be located at various points of entry and exit from a property (e.g., at various doors).

Figure 5:
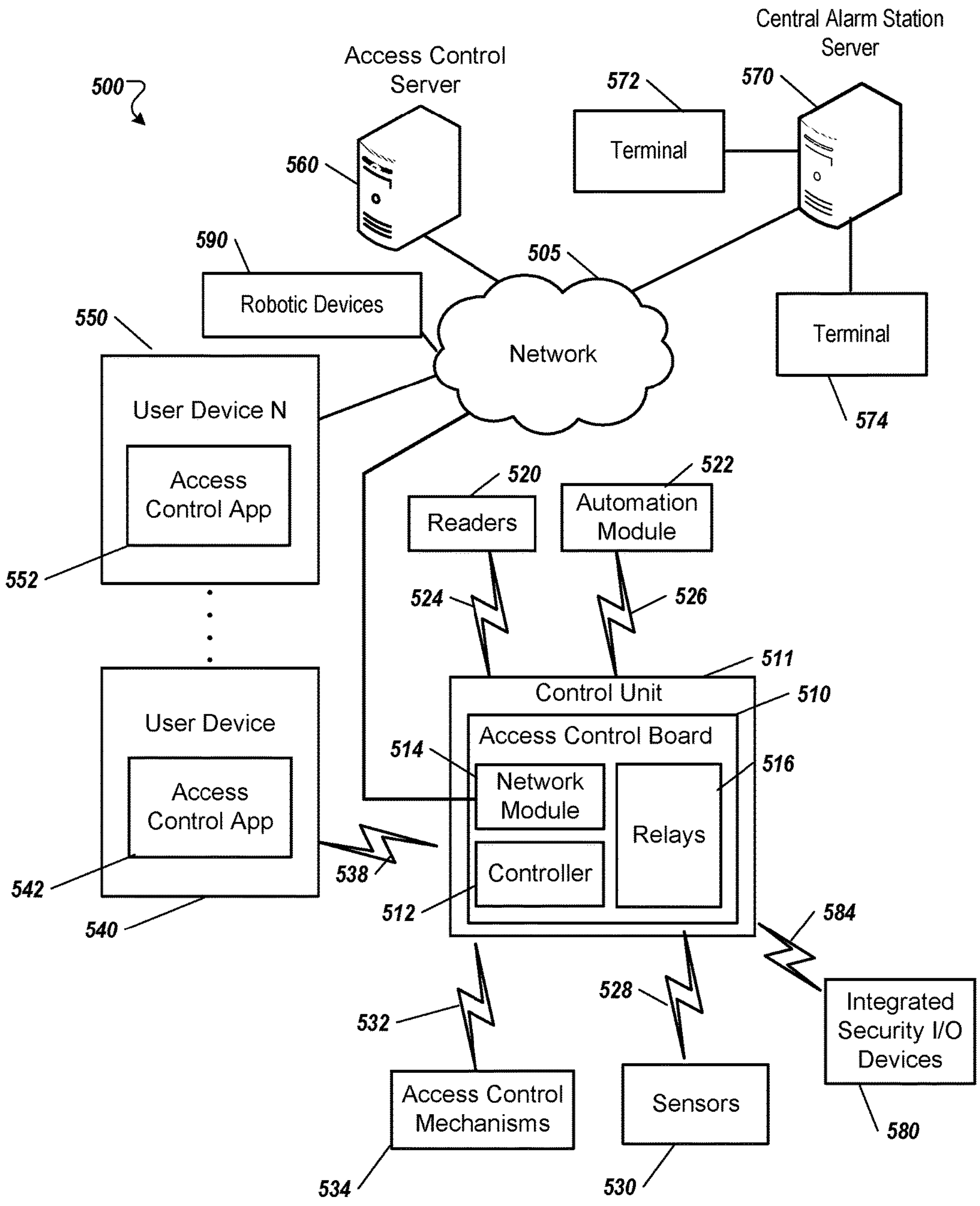
FIG. 5 is a block diagram of an example monitoring system for access control provisioning.

The monitoring system also can include a monitor control unit, which can be, for example, the access control system 120 of FIG. 1 or the control unit 511 of FIG. 5. The control unit may receive, from the input device an access control request. For example, the control unit may receive an access control request that was input by a user swiping a card at a card reader located at a particular door.

The monitoring system also includes a plurality of relays. A particular relay may correspond to a particular access control device. The access control device can be, for example, a magnetic lock or an electronic lock on a door of the property. The access control device can also be another access control mechanism. The access control device is configured to receive an access control request and provide access to a portion of the property, e.g., to unlock a door, in response to the access control request.

At step 410, the monitor control unit transmits through a given relay of the plurality of relays, the received access control request. In some examples, transmitting the access control request may cause the given relay to change state (e.g., open or close).

At step 420, an access control device of the monitoring system associated with the given relay receives the given access control request. In response to the access control request, the access control device may change state. For example, the access control device may unlock a magnetic door lock.

At step 430, the monitoring system receives data indicating that the access control device received the given access control request. For example, the monitoring system can receive data indicating that a particular door was unlocked, indicating that the access control device associated with that door received the given access control request. The monitoring system can receive the data, for instance, from a sensor associated with the particular door or from a user monitoring the door.

In some implementations, when the control unit transmits the access control request through the relay, it also sends, to a user's client device, additional data indicating that the request was transmitted. For example, the control unit may send a message to a user's mobile computing device notifying the user that the unit transmitted the access control request through the relay.

After receiving the message, the user may monitor the particular door associated with the access control device to determine whether the device received the request (e.g., to determine whether the particular door unlocked). If the user determines that the access control device received the request (e.g., the door unlocked), the user may send data indicating that the access control device received the request to the control unit through the mobile computing device.

At step 440, based on the data indicating that the access control device received the given access control request, the monitoring system determines that the given relay of the plurality of relays corresponds to the access control device. For example, if the access control device is configured to provide access to the portion of the property through a particular door, the system can determine that the given relay and the access control device both correspond to the particular door.

In some examples, based on the data indicating that the access control device received the given access control request, the system can also associate the particular input device that provided the access control request to the given relay that corresponds to the access control device. For example, the monitoring system can store data indicating that the particular input device (e.g., a card reader) is at the same door as the access control device (e.g., the door lock) that corresponds to, or is controlled by, the given relay.

In some examples, the monitoring system may receive data indicating that the access control device did not receive the given access control request. For example, the access control device may be associated with a relay different from the given relay through which the control unit transmitted the request. Based on the data indicating that the access control device did not receive the given access control request, the monitoring system may determine that the given relay of the plurality of relays does not correspond to the access control device.

For example, after transmitting the access control request through the given relay, the monitoring system may determine that a particular amount of time has elapsed without receiving data indicating that the access control device received the request. Based on determining that the system has not received data indicating reception within the particular amount of time, the system may determine that the given relay does not correspond to the access control device.

In some implementations, if the monitoring system receives data indicating that the access control device did not receive the given access control request, it may transmit the access control request through a second relay of the plurality of relays. The monitoring system can then continue to cycle through relays (e.g., transmitting the request through a relay, receiving data indicating that the device did not receive the request, transmitting the request through a different relay, etc.) until it receives data indicating that the particular access control device received the access control request.

In some implementations, the system only transmits the access control request through relays that are already not associated with a different access control device. For example, before transmitting the access control request through a given relay, the system can determine that the given relay does not correspond to a different access control device and, based on that determination, transmit the access control request.

In some implementations, the system repeats this process for additional access control devices of the monitoring system. For example, the system can receive an access control request from an additional input device, then transmit that request through a given relay and wait to receive data indicating that the additional access control device received the request. If the system determines that the access control device did not receive the request, it can transmit the request through a second relay, and so on, until it identifies the relay that corresponds to the additional access control device.

In some implementations, the monitoring system includes an input device that is located at the property and that is configured to transmit data indicating an interaction with the device. For example, the input device may be an electronic card reader configured to transmit data indicating that a card has been swiped at the reader or an exit button configured to transmit data indicating that the button has been pressed. The monitor control unit of the system also includes a plurality of input terminals that are each configured to receive data indicating an interaction with a given input device. The control unit can be further configured to (i) receive, through a given input terminal of the plurality of input terminals, the data indicating the interaction with the input device; (ii) receive, from a client device, data indicating that the input device is associated with a particular door; and (iii) based on the data indicating that the input device is associate with the door, determining that the given input terminal and the input device both correspond to the particular door.

For example, the control unit may receive data on a particular input terminal indicating that there was an interaction with an input device. The control unit may also receive data from a user through a client device indicating that the user pressed an exit button that is associated with a particular door. Based on the data from the user, the control unit may determine that the exit button and the particular input terminal both correspond to the particular door indicated by the user.

FIG. 5 is a block diagram of an example monitoring system 500 for access control provisioning. The electronic system 500 includes a network 505, an access control board 510, one or more user devices 540, 550, and an access control server 560. In some examples, the network 505 facilitates communications between the access control board 510, the one or more user devices 540, 550, and the access control server 560. In some examples, the system 500 is also configured to perform property monitoring.

The network 505 is configured to enable exchange of electronic communications between devices connected to the network 505. For example, the network 505 may be configured to enable exchange of electronic communications between the access control board 510, the one or more user devices 540, 550, and the access control server 560. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The access control board 510 includes a controller 512, a network module 514, and a set of relays 516. In some examples, the system 500 includes multiple access control boards such as access control board 510. The controller 512 is configured to control an access control system (e.g., a commercial security system or a home alarm system) that includes the access control board 510. In some examples, the controller 512 may include a processor or other control circuitry configured to execute instructions of a program that controls operation of a security system. In these examples, the controller 512 may be configured to receive input from readers, sensors, detectors, or other devices included in the security system and control operations of devices included in the security system (e.g., a door, a magnetic lock, etc.). For example, the controller 512 may be configured to control operation of the network module 514 and the relays 516 included in the access control board 510.

In some examples, the access control board 510 is part of a control unit 511, which may be similar to the access control system 120 of FIG. 1. In these examples, the controller 512 and the network module 514 may also be part of the control unit 511. The controller 512 may be configured to receive input from sensors, flow meters, or other devices included in the control unit system and control operations of devices included in the household (e.g., speakers, lights, doors, etc.) and/or the access control board 510. In some examples, the control unit 511 may be configured to control operation of the controller 512 and/or the network module 514.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit security data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the access control board 510 and/or the control unit 511 to communicate over a local area network and/or the Internet. The network module 514 also may be a voiceband modem configured to enable the alarm panel to communicate over the telephone lines of Plain Old Telephone Systems (POTS).

The monitoring system 500 that includes the access control board 510 includes one or more readers or detectors. For example, the access control system may include multiple readers 520. The readers 520 may include a card reader, a badge reader, a barcode reader, a radio-frequency identification reader, a Bluetooth low energy (BLE) reader, a near-field communication (NFC) device, or any other type of reader included in an alarm system or security system. For example, the readers 520 may include a RFID sensor that identifies a particular article that includes a pre-assigned RFID tag. In some examples, the readers 520 can include pinpads or other devices that enable a user to input an authentication code or other user credentials.

The relays 516 include functionality that can control and adjust states of access control mechanisms 534 in response to events detected at the readers 520. The events detected at the readers 520 may include scanning an RFID card at an RFID reader. In this instance, the controller 512 may cycle through the relays 516 to match the reader 520 with a particular relay. For example, the relays 516 may be fired by the controller 512 in response to an event detected by a reader 520. The relays 516 may be fired until a particular access control mechanism 534 is determined to match one of the fired relays 516. Therefore, the relays 516 may be associated with access control mechanisms 534 via the controller 505, input at the user devices 540, 550, the access control server 560, and so on.

The access control board 510 communicates with the automation module 522 and the access control mechanisms 534 to enable access control provisioning. The module 522 is connected to one or more devices that enable property automation control. For instance, the module 522 may be connected to one or more doors and may be configured to control operation of the one or more doors. Also, the module 522 may be connected to one or more electronic locks at a property and may be configured to control operation of the one or more electronic locks (e.g., control Z-Wave locks using wireless communications in the Z-Wave protocol).

The access control mechanisms 534 may be a lock for a door, a magnetic lock, or any other type of access control device that may control access permissions. The access control mechanisms 534 may be controlled based on commands received from the access control board 510 or the control unit 511, possibly through the module 522. For instance, the control unit 511 or board 510 may cause an access control mechanism 534, such as a lock for a door, to open when an RFID card is read by an RFID reader 520.

The access control mechanisms 534 may be triggered by several different types of techniques. For instance, a Passive Infra-Red (PIR) motion sensor may be built into the access control mechanisms 534 and used to trigger the access control mechanisms 534. The access control mechanisms 534 may be powered by internal, replaceable batteries if located remotely from the access control board 510. The access control mechanisms 534 may employ a small solar cell to recharge the battery when light is available. Alternatively, the access control mechanisms 534 may be powered by the controller's 512 power supply if the access control mechanisms 534 is co-located with the controller 512.

In some implementations, the access control mechanisms 534 communicate directly with the access control server 560 over the Internet. In these implementations, data communicated by the access control mechanisms 534 does not pass through the access control board 510 and the access control mechanisms 534 receive commands from the access control server 560.

The system 500 further includes one or more communications links such as communications links 524, 526, 532, and 538. The communications links 524, 536, 532, and 538 may be any combination of wired or wireless links. The wireless communication links may include, for example, a local Wi-Fi network, and other wireless networks, as described below. The communication links 524, 526, 532, and 538 may include a local network. The readers 520, the module 522, the access control mechanisms 534 and the controller 512 may exchange data and commands over the local network. The local network may include 802.11 "Wi-Fi" wireless Ethernet (e.g., using low-power Wi-Fi 33 chipsets), Z-Wave, ZigBee, Bluetooth, "Home plug" or other "Powerline" networks that operate over AC wiring, and a Category 5 (CATS) or Category 6 (CAT6) wired Ethernet network. The local network may be a mesh network constructed based on the devices connected to the mesh network.

The access control server 560 is an electronic device configured to provide access control services by exchanging electronic communications with the access control board 510 or monitor control unit 511, and the one or more user devices 540, 550 over the network 505. For example, the access control server 560 may be configured to monitor events (e.g., access control events) generated by the access control board 510 or control unit 511. In this example, the access control server 560 may exchange electronic communications with the network module 514 to receive information regarding events (e.g., access control events) detected by the access control board 510 or control unit 511. The access control server 560 also may receive information regarding events (e.g., access control events) from the one or more user devices 540, 550.

The one or more user devices 540, 550 are devices that host and display user interfaces. For instance, the user device 540 is a mobile device that hosts one or more native applications (e.g., access control application 542, 552). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the access control system, such as placing personal telephone calls, playing music, playing video, displaying pictures, browsing the Internet, maintaining an electronic calendar, etc.

The user device 540, 550 includes an access control application 542, 552. The access control application 542, 552 refers to a software/firmware program running on the corresponding mobile device that enables the user interface and features for communicating with the access control board 510 or control unit 511. The user device 540 may load or install the access control application 542, 552 based on data received over a network or data received from local media. The access control application 542, 552 runs on mobile devices platforms, such as iPhone, iPod touch, Blackberry, Google Android, Windows Mobile, etc. The access control application 542, 552 may facilitate communication between the readers 520, the automation module 522, the access control mechanisms 534 and the access control board 510 using one or more communication links 524, 526, 532, 538.

In some implementations, the readers 520, the module 522, and the access control mechanisms 534 are configured to communicate access control data to the one or more user devices 540, 550 over network 505 (e.g., the Internet, cellular network, etc.). In another implementation, the readers 520, the module 522, and the access control mechanisms 534 are intelligent enough to change the communication pathway from a direct local pathway when the one or more user devices 540, 550 are in close physical proximity to the readers 520, the module 522, and the access control mechanisms 534 to a pathway over network 505 when the one or more user devices 540, 550 are farther from the readers 520, the module 522, and the access control mechanisms 534.

In some examples, the system leverages GPS information from the one or more user devices 540, 550 to determine whether the one or more user devices 540, 550 are close enough to the readers 520, the module 522, and the access control mechanisms 534 to use the direct local pathway or whether the one or more user devices 540, 550 are far enough from the readers 520, the module 522, and the access control mechanisms 534, that the pathway over network 505 is required. In other examples, the system leverages status communications (e.g., pinging) between the one or more user devices 540, 550 and the readers 520, the module 522, and the access control mechanisms 534, to determine whether communication using the direct local pathway is possible. If communication using the direct local pathway is possible, the one or more user devices 540, 550 communicate with the readers 520, the module 522, and the access control mechanisms 534, using the direct local pathway. If communication using the direct local pathway is not possible, the one or more user devices 540, 550 communicate with the readers 520, the module 522, and the access control mechanisms 534 using the pathway over network 505.

In some implementations, the system 500 provides end users with notifications that correspond to states of the access control mechanisms 534. The system 500 may transmit the images captured by the access control mechanisms 534 over a wireless WAN network to the user devices 540, 550. Because transmission over a wireless WAN network may be relatively expensive, the system 500 uses several techniques to reduce costs while providing access to significant levels of useful visual information.

In some implementations, a state of the access control system and other events sensed by the access control system may be used to enable/disable magnetic locks or doors (e.g., access control mechanisms 534). In these implementations, the access control mechanisms 534 may be triggered to change states (e.g., unlock or lock) when the access control system detects an event, such as an access control event.

In some implementations, the system 500 also performs property monitoring functions. In such implementations, the system 500 includes one or more sensors 530. The sensors 530 may include a lock sensor, a contact sensor, a motion sensor, or any other type of sensor included in a control unit system. The sensors 530 also may include an environmental sensor, such as a temperature sensor, a water sensor, a rain sensor, a wind sensor, a light sensor, a smoke detector, a carbon monoxide detector, an air quality sensor, etc. The sensors 530 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 530 can also include a radio-frequency identification (RFID) sensor that identifies a particular article that includes a pre-assigned RFID tag.

The sensors 530 can also include one or more cameras. The camera 530 may be a video/photographic camera or other type of optical sensing device configured to capture images. For instance, the camera 530 may be configured to capture images of an area within a property monitored by the control unit 511. The camera 530 may be configured to capture single, static images of the area and also video images of the area in which multiple images of the area are captured at a relatively high frequency (e.g., thirty images per second). The camera 530 may be controlled based on commands received from the control unit 511.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the other sensors 530, PIR, door/window, etc.) detect motion or other events. In some implementations, the camera 530 receives a command to capture an image when external devices detect motion or another potential alarm event. The camera 530 may receive the command from the control unit 511 or directly from one of the other sensors 530.

In some examples, the camera 530 triggers integrated or external illuminators (e.g., Infra-Red, Z-wave controlled "white" lights, lights controlled by the automation module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the controller 512. The camera 530 may employ a small solar cell to recharge the battery when light is available. Alternatively, the camera 530 may be powered by the controller's 512 power supply if the camera 530 is co-located with the controller 512.

The sensors 530 may communicate with the control unit 511 via a communication link 528. The link 528 can be any combination of wired or wireless. In some examples, the link 528 is part of a local area network, a wide area network, or the internet. The link 528 can be similar to links 524, 526, 532, 538.

In some examples, the access control server 560 may serve a monitoring function by routing alert data received from the network module 514 or the one or more user devices 540 and 550 to a central alarm station server 570. For example, the access control server 560 may transmit the alert data to the central alarm station server 570 over the network 505. For property monitoring functions, the access control server 560 can be configured to provide monitoring services by exchanging electronic communications with the control unit 511, the one or more user devices 540 and 550, and the central alarm station server 570 over the network 505. For example, the access control server 560 may be configured to monitor events (e.g., alarm events) generated by the control unit 511. In this example, the access control server 560 may exchange electronic communications with the network module 514 to receive information regarding events (e.g., alerts) detected by the control unit 511. The access control server 560 also may receive information regarding events (e.g., alerts) from the one or more user devices 540 and 550.

The access control server 560 may store sensor and image data received from various devices of the access control system and perform analysis of sensor and image data. Based on the analysis, the access control server 560 may communicate with and control aspects of the control unit 511 or the one or more user devices 540 and 550.

The central alarm station server 570 is an electronic device configured to provide alarm monitoring service by exchanging communications with the control unit 511, the one or more mobile devices 540 and 550, and the access control server 560 over the network 505. For example, the central alarm station server 570 may be configured to monitor alerting events generated by the control unit 511. In this example, the central alarm station server 570 may exchange communications with the network module 514 included in the control unit 511 to receive information regarding alerting events detected by the control unit 511. The central alarm station server 570 also may receive information regarding alerting events from the one or more mobile devices 540 and 550 and/or the access control server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 530 detected motion from a motion sensor via the sensors 530. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

In some examples, the system 500 further includes one or more robotic devices 590. The robotic devices 590 may be any type of robots that are capable of moving and taking actions that assist in property monitoring. For example, the robotic devices 590 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 590 may be robotic devices 590 that are intended for other purposes and merely associated with the system 500 for use in appropriate circumstances.

In some examples, the robotic devices 590 automatically navigate within a property. In these examples, the robotic devices 590 include sensors and control processors that guide movement of the robotic devices 590 within the property. For instance, the robotic devices 590 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles at the property and guide movement of the robotic devices 590 in a manner that avoids the walls and other obstacles.

In addition, the robotic devices 590 may store data that describes attributes of the property. For instance, the robotic devices 590 may store a floorplan and/or a three-dimensional model of the property that enables the robotic devices 590 to navigate the property. During initial configuration, the robotic devices 590 may receive the data describing attributes of the property, determine a frame of reference to the data (e.g., a property or reference location at the property), and navigate the property based on the frame of reference and the data describing attributes of the property. Further, initial configuration of the robotic devices 590 also may include learning of one or more navigation patterns in which a user provides input to control the robotic devices 590 to perform a specific navigation action (e.g., fly to a second floor office and spin around while capturing video and then return to a property charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person at the property with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 511, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the property. The communication module further may be a 900 MHz wireless communication module that enables the robotic devices 590 to communicate directly with the control unit 511. Other types of short-range wireless communication protocols, such as Bluetooth, Bluetooth LE, Z-wave, Zigbee, etc., may be used to allow the robotic devices 590 to communicate with other devices at the property. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 are associated with one or more charging stations. The charging stations may be located at predefined property base or reference locations at the property. The robotic devices 590 may be configured to navigate to the charging stations after completion of tasks needed to be performed for the system 500. For instance, after completion of a monitoring operation or upon instruction by the control unit 511, the robotic devices 590 may be configured to automatically fly to and land on one of the charging stations. In this regard, the robotic devices 590 may automatically maintain a fully charged battery in a state in which the robotic devices 590 are ready for use by the system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

The system 500 further includes one or more integrated security devices 580. The one or more integrated security devices may include any type of device used to provide alerts based on received sensor data. For instance, the control unit 511 may provide one or more alerts to the one or more integrated security input/output devices 580. Additionally, the control unit 511 may receive sensor data from the sensors 530 and determine whether to provide an alert to the one or more integrated security input/output devices 580.

The integrated security input/output devices may communicate with the control unit 511 via a communication link 584. The link 584 can be any combination of wired or wireless. In some examples, the link 584 is part of a local area network, a wide area network, or the internet. The link 584 can be similar to links 524, 526, 528, 532, 538.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A monitoring system that is configured to monitor a property, the monitoring system comprising:

an input device that is located at the property and that is configured to transmit data indicating an interaction with the input device;

an access control device that is configured to:

receive an access control request; and provide access to a portion of the property in response to the access control request;

a monitor control unit that (i) includes an input terminal and (ii) is configured to:

transmit, through a given relay of a plurality of relays, a given access control request;

receive data indicating that the access control device received the given access control request;

based on the data indicating that the access control device received the given access control request, determine that the given relay of the plurality of relays corresponds to the access control device;

receive, through the input terminal, the data indicating the interaction with the input device;

receive, from a client device, data indicating that the input device is associated with a door; and based on the data indicating that the input device is associated with the door, determine that the given input terminal and the input device both correspond to the door.

2. The system of claim 1, comprising:

an additional access control device that is configured to:

receive an additional access control request; and provide access to an additional portion of the property in response to the additional access control request, wherein the monitor control unit is configured to:

receive additional data indicating that the additional access control device did not receive the given access control request; and based on the additional data indicating that the additional access control device did not receive the given access control request, determine that the given relay of the plurality of relays does not correspond to the additional access control device.

3. The system of claim 1, comprising:

an additional access control device that is configured to:

receive an additional access control request;

provide access to an additional portion of the property in response to the additional access control request, wherein the monitor control unit is configured to:

transmit, through an additional relay of the plurality of relays, an additional access control request;

receive additional data indicating that the additional access control device received the additional access control request; and based on the additional data indicating that the additional access control device received the additional access control request, determine that the additional relay of the plurality of relays corresponds to the additional access control device.

4. The system of claim 1, wherein the monitor control unit is configured to:

based on transmitting, through the given relay of the plurality of relays, the given access control request, transmit, to the client device, additional data indicating that the monitor control unit transmitted the given access control request, wherein the additional data indicating that the access control device received the given access control request is received from the client device.

5. The system of claim 1, wherein the monitor control unit is configured to:

before transmitting, through the given relay of the plurality of relays, the given access control request, determine that the given relay does not correspond to an additional access control device, wherein transmitting, through the given relay of a plurality of relays, the given access control request is based on determining that the given relay does not correspond to the additional access control device.

6. The system of claim 1, comprising:

an additional access control device that is configured to:

receive an additional access control request; and provide access to an additional portion of the property in response to the additional access control request, wherein the monitor control unit is configured to:

after transmitting, through the given relay of the plurality of relays, the given access control request, determine that a particular amount of time has elapsed; and determine that the given relay of the plurality of relays does not correspond to the additional access control device based on determining that the particular amount of time has elapsed after transmitting, through the given relay of the plurality of relays, the given access control request.

7. The system of claim 1, wherein:

the access control device is configured to provide access to the portion of the property through the door, and the monitor control unit is configured to:

based on determining that the given relay of the plurality of relays corresponds to the access control device, determine that the given relay of the plurality of relays and the access control device both correspond to the door.

8. The system of claim 1, wherein the input device is an electronic card reader or a request to exit device.

9. The system of claim 1, wherein the access control device is a magnetic door lock or an electronic door lock.

10. A computer-implemented method, comprising:

transmitting, through a given relay of a plurality of relays included in a monitoring system that is configured to monitor a property, a given access control request;

receiving, by an access control device of the monitoring system, the given access control request, wherein the access control device is configured to provide access to a portion of the property in response to an access control request;

receiving, by the monitoring system, data indicating that the access control device received the given access control request;

based on the data indicating that the access control device received the given access control request, determining, by the monitoring system, that the given relay of the plurality of relays corresponds to the access control device;

receiving, through an input terminal included in the monitoring system, data indicating an interaction with the input device;

receiving, from a client device and by the monitoring system, data indicating that the input device is associated with a door; and based on the data indicating that the input device is associated with the door, determining, by the monitoring system, that the given input terminal and the input device both correspond to the door.

11. The method of claim 10, comprising:

receiving, by the monitoring system, additional data indicating that an additional access control device did not receive the given access control request, wherein the additional access control device is configured to provide access to an additional portion of the property in response to receiving additional access control request; and based on the additional data indicating that the additional access control device did not receive the given access control request, determining, by the monitoring system that the given relay of the plurality of relays does not correspond to the additional access control device.

12. The method of claim 10, further comprising:

transmitting, through an additional relay of the plurality of relays, an additional access control request;

receiving, by the monitoring system, additional data indicating that an additional access control device received the additional access control request, wherein the additional access control device is configured to provide access to an additional portion of the property in response to receiving the additional access control request; and based on the additional data indicating that the additional access control device received the additional access control request, determining, by the monitoring system, that the additional relay of the plurality of relays corresponds to the additional access control device.

13. The method of claim 10, further comprising:

based on transmitting, through the given relay of the plurality of relays, the given access control request, transmitting, to the client device, additional data indicating that the given access control request was transmitted, wherein the additional data indicating that the access control device received the given access control request is received from the client device.

14. The method of claim 10, further comprising:

before transmitting, through the given relay of the plurality of relays, the given access control request, determining, by the monitoring system, that the given relay does not correspond to an additional access control device, wherein transmitting, through the given relay of a plurality of relays, the given access control request is based on determining that the given relay does not correspond to the additional access device.

15. The method of claim 10, further comprising:

after transmitting, through the given relay of the plurality of relays, the given access control request, determining, by the monitoring system, that a particular amount of time has elapsed; and determining that the given relay of the plurality of relays does not correspond to an additional access control device based on determining that the particular amount of time has elapsed after transmitting, through the given relay of the plurality of relays, the given access control request, wherein the additional access control device is configured to provide access to an additional portion of the property in response to receiving an additional access control request.

16. The method of claim 10, wherein:

the access control device is configured to provide access to the portion of the property through the door, and the method further comprises, based on determining that the given relay of the plurality of relays corresponds to the access control device, determining, by the monitoring system, that the given relay of the plurality of relays and the access control device both correspond to the door.

17. The method of claim 10, wherein the input device is an electronic card reader or a request to exit device.

18. The method of claim 10, wherein the access control device is a magnetic door lock or an electronic door lock.

* * * * *